US012605723B2

(12) United States Patent
Hofman

(10) Patent No.: US 12,605,723 B2
(45) Date of Patent: Apr. 21, 2026

(54) SHOWERHEAD ASSEMBLY WITH OSCILLATING NOZZLE

(71) Applicant: ETL, LLC, Sparks, NV (US)

(72) Inventor: David Hofman, Reno, NV (US)

(73) Assignee: ETL, LLC, Sparks, NV (US)

( * ) Notice: Subject to any disclaimer, the term of this patent is extended or adjusted under 35 U.S.C. 154(b) by 285 days.

(21) Appl. No.: 18/139,883

(22) Filed: Apr. 26, 2023

(65) Prior Publication Data

US 2024/0189840 A1 Jun. 13, 2024

Related U.S. Application Data

(63) Continuation-in-part of application No. 17/157,786, filed on Jan. 25, 2021, now Pat. No. 11,660,623.

(60) Provisional application No. 63/074,412, filed on Sep. 3, 2020.

(51) Int. Cl.
*B05B 1/18* (2006.01)
*B05B 1/16* (2006.01)
*B05B 15/654* (2018.01)

(52) U.S. Cl.
CPC .............. *B05B 1/18* (2013.01); *B05B 1/1636* (2013.01); *B05B 15/654* (2018.02)

(58) Field of Classification Search
CPC ........ B05B 1/18; B05B 1/1636; B05B 15/654
See application file for complete search history.

(56) References Cited

U.S. PATENT DOCUMENTS

| | | | |
|---|---|---|---|
| 3,498,543 A | 3/1970 | Gilmour | |
| 4,261,514 A | 4/1981 | Kennard et al. | |
| 4,588,130 A | 5/1986 | Trenary et al. | |
| 5,215,258 A | 6/1993 | Jursich | |
| 5,433,384 A | 7/1995 | Chan et al. | |
| 5,476,225 A | 12/1995 | Chan | |
| 5,704,547 A | 1/1998 | Golan et al. | |
| 6,360,967 B1 | 3/2002 | Schorn | |
| 6,845,921 B2 * | 1/2005 | Schorn | B05B 3/0417 239/389 |
| D515,661 S | 2/2006 | Hughes et al. | |
| 7,014,128 B2 | 3/2006 | Leung | |
| 7,770,820 B2 | 8/2010 | Clearman et al. | |
| D649,623 S | 11/2011 | Flowers | |
| D669,962 S | 10/2012 | Schoenherr et al. | |
| D694,357 S | 11/2013 | Brodey et al. | |
| D710,973 S | 8/2014 | Madsen | |
| 8,794,543 B2 | 8/2014 | Leber | |
| 9,895,701 B2 | 2/2018 | Tian et al. | |

(Continued)

*Primary Examiner* — Qingzhang Zhou
(74) *Attorney, Agent, or Firm* — ONE LLP

(57) ABSTRACT

A showerhead assembly is provided which includes a conduit, a gear train and oscillating nozzle chamber. The gear train includes a propeller, toothed pinion, and toothed gear. Water flows from the conduit into an internal chamber within the showerhead housing. Specifically, water enters the propeller thereby causing it to rotate, the rotation of which causes the pinion to rotate, and consequently, the toothed gear to revolve. Additionally, a pin seated on the toothed gear rotates, thereby causing the nozzle chamber to oscillate. Further, the chamber's horizontal movement is hindered by one or more shoulder arms. As water exits the toothed gear, it travels through a central channel and into the oscillating nozzle chamber, whereby it expels through the nozzle outlet in a reciprocating spray pattern.

12 Claims, 14 Drawing Sheets

(56) References Cited

U.S. PATENT DOCUMENTS

| | | | | |
|---|---|---|---|---|
| 2018/0318853 | A1* | 11/2018 | Lin .................... | A61H 33/6057 |
| 2019/0143348 | A1 | 5/2019 | Quinn et al. | |

* cited by examiner

SHOWERHEAD ASSEMBLY WITH OSCILLATING NOZZLE

RELATED APPLICATIONS

The present application is a continuation-in-part of U.S. patent application Ser. No. 17/157,786, filed on Jan. 25, 2021, which in turn claims priority to U.S. Provisional Patent Application Ser. No. 63/074,412, filed on Sep. 3, 2020.

BACKGROUND OF THE INVENTION

The present invention relates to showerheads. More particularly, the present invention relates to showerhead spray nozzles that pivot up and down or side-to-side so as to produce an oscillating spray pattern.

Showerheads are commercially available in numerous designs and configurations for use in showers, faucets, spas, sprinklers and other personal and industrial systems. The vast majority of showerheads include spray heads which provide constant or pulsed sprays and have either fixed or adjustable openings. Stationary spray heads with fixed jets are the simplest constructions consisting essentially of a central conduit connected to one or more spray nozzles directed to produce a constant pattern. The stationary spray showerheads cause water to flow through the construction to contact essentially the same points on a user's body in a repetitive fashion.

Multifunction showerheads are able to deliver water in many different spray patterns such as a fine spray, a coarse spray, a pulsating spray, or even a flood pattern providing high fluid flow but decreased velocity. Of course, many other spray patterns may also be provided.

Many showerhead assemblies allow users to manipulate spray nozzles into various positions and alignments to assist in the cleaning process. Advantageously, some showerhead assemblies include spray nozzles which can direct water to different locations within a shower stall, allowing water to contact desired locations on a user's body. Recently, showerhead assemblies have included settings which allow water to shift from outer and inner nozzles, causing water to project at varying directions onto the user. Unfortunately, these constructions either require the user to manually maneuver the showerhead assembly or the water to alternate between varying nozzles in order to produce a spray pattern that directs water to multiple locations.

Thus, it would further be advantageous to provide a showerhead assembly that included a primary showerhead with one or more oscillating nozzles so as to create a reciprocating spray pattern.

Further, it would be advantageous to provide a showerhead assembly that included nozzle sets containing different spray patterns and multiple nozzles so as to enable the user to create a unique shower experience.

SUMMARY OF THE INVENTION

Briefly, in accordance with the invention, an improved water spraying assembly is provided which includes a gear train and at least one oscillating nozzle chamber system. The water spraying assembly has particular application for use within a showerhead. Accordingly, the preferred water spraying assembly is described as a showerhead assembly.

The primary showerhead can be relatively traditional in construction including a showerhead housing connected to a water source by a neck portion. Additionally, the neck portion includes a conduit having an inlet threadably affixed to a water source pipe. The inlet is in fluid connection with the pipe so as to receive water from it and allow such water to travel through showerhead housing and into the nozzle outlet for ejection. Various showerhead housing and conduit constructions can be determined by those skilled in the art. For example, the showerhead may include a simple housing affixed directly to the pipe of a water source. Alternatively, the showerhead may be of the handheld type including a handle and flexible hose that connects to the pipe of a water source. Moreover, the showerhead may include various modifications of these well-known assemblies such as a combination fixed and handheld showerhead.

Preferably, the conduit's inlet collects water from the water source and empties such water into the housing's water chamber that is in fluid connection with the gear train. The gear train includes three wheel portions: a propeller, toothed pinion, and toothed gear. Specifically, the water received by the water chamber flows through the propeller portion of the gear train, whereby such water flow causes the propeller to rotate in a counterclockwise direction. The propeller, which is directly adjacent to and coupled with the pinion, continues to rotate as water passes through, thereby causing the pinion to rotate in a counterclockwise direction. Additionally, the pinion, which is meshed and in tooth engagement with the toothed gear, causes the toothed gear to revolve in a clockwise direction as water flows from the rotating pinion portion and passes through the toothed gear. Further, a pin is seated on the outer surface of the toothed gear. The pin is offset from the toothed gear's central axis which causes the pin to rotate in a circular path as a result of the rotation of the toothed gear. The water then exits through a central channel housed in a shoulder arm of the nozzle chamber system.

In preferred embodiments, the compound gear is mounted to a gear housing by arbors so as to allow the gear train to rotatably pivot with the passage of water. Specifically, the gear housing includes a front plate and a back plate. The front plate is affixed to and secured onto the back plate which forms the cover of the compound gear mechanism. In some preferred embodiments, the front plate and back plate are circular in shape. In other preferred embodiments, the front plate and back plate are rectangular in shape.

The nozzle chamber system can include one or more shoulder arms and a cylindrical nozzle housing having a central chamber. In some preferred embodiments, the nozzle chamber system comprises a right solid shoulder arm and a left hollow shoulder arm. In these embodiments, the two shoulder arms hold the nozzle housing in position along a longitudinal axis. Specifically, the right solid shoulder arm functions as a support arm and is connected to the cylindrical nozzle chamber by an axle. Even more specifically, the left hollow shoulder arm contains a central channel and is aligned with and connected to the cylindrical nozzle's central chamber by two rotatable metal spindles and a bearing which allow the nozzle housing to rotate about its longitudinal axis. The two spindles and bearing encircle the exit of the central channel that is in fluid connection with the cylindrical nozzle chamber.

In some preferred embodiments, the cylindrical nozzle chamber includes a pin slot and a nozzle outlet. Upon rotation of the toothed gear, the pin, which is within the nozzle housing's pin slot, also rotates thereby pushing and pulling the nozzle housing in an oscillating movement. This, in turn, causes the axle, bearing and two spindles to oscillate. Specifically, the oscillating pin forces the nozzle chamber to pivot about its longitudinal axis while the shoulder arms hold the nozzle chamber in place, preventing horizontal rotation of the nozzle chamber thereby restricting the oscillating nozzles to an upward and downward direction.

In other preferred embodiments, the nozzle chamber system comprises one shoulder arm and an axle. In these embodiments, the shoulder arm is a hollow shoulder arm. The hollow shoulder arm and axle hold the nozzle housing in position along a longitudinal axis so as to prevent horizontal movement as water sprays out of the oscillating nozzle chamber's outlet. Further, the hollow shoulder arm houses the central channel which receives water from the cavity and transports it to the nozzle's central chamber.

In some embodiments, the gear housing comprises a rocker plate with a pin engaging lip configured to interface with the pin. Specifically, upon rotation of the toothed gear, the pin rotates in a circular path along the pin engaging lip so as to cause the rocker plate to pivot along a horizontal axis. More specifically, a portion of the rocker plate is configured to interface with a lever which swings and thereby causes the nozzle housing to oscillate. Even more specifically, as the rocker plate pivots, the lever swings from side to side and forces the nozzle housing to oscillate about its longitudinal axis while the shoulder arm and axle hold the nozzle housing in place preventing horizontal rotation of the nozzle housing.

In preferred embodiments, though not shown in the figures, this entire assembly can be rotated 90° so as to have the nozzle housing rotate about the vertical axis and thereby provide a side-to-side oscillating spray.

Concurrently, water continues to flow through the gear train, passing the oscillating pin, and traveling through the central channel into the nozzle's central chamber. Water is then ejected out of the nozzle housing through the nozzle outlet. Specifically, and in combination with the oscillating movement of the nozzle housing, the water is ejected from the nozzle outlet in a reciprocating spray pattern.

Thus, it is an object of the present invention to provide a spray head assembly having an improved oscillating nozzle compared to previous showerheads.

Furthermore, it is an additional object of the present invention to provide a spray head assembly having an improved construct so as to generate an oscillating spray pattern without the need for multiple nozzles or user intervention.

Other features and advantages of the present invention will be appreciated by those skilled in the art upon reading the detailed description which follows with reference to the drawings.

BRIEF DESCRIPTION OF THE DRAWINGS

These and other, further and more specific objects and advantages of the invention will be apparent to those skilled in the art from the following detailed description thereof, taken in conjunction with the Drawings, in which.

DETAILED DESCRIPTION OF THE INVENTION

Figure 1:
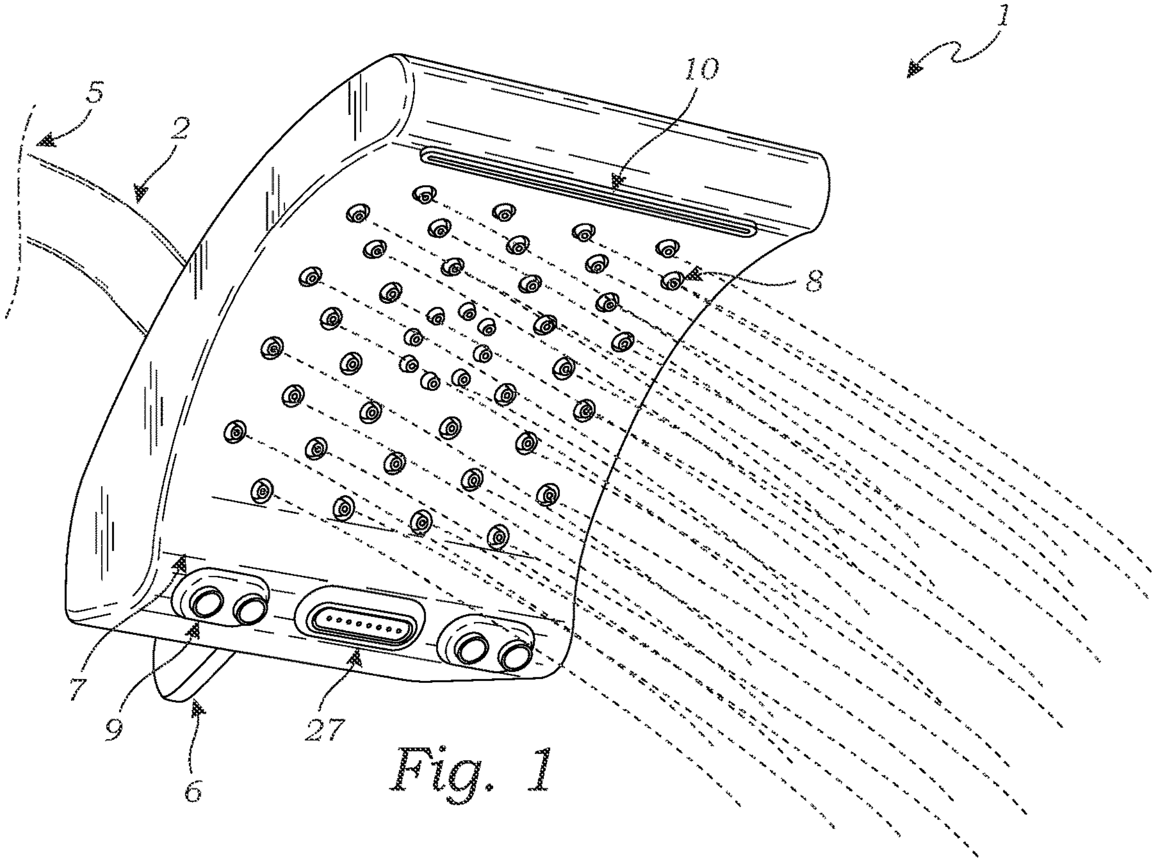
FIG. 1 is a left perspective view of the showerhead assembly wherein the primary nozzles are expelling water.
Figure 2:
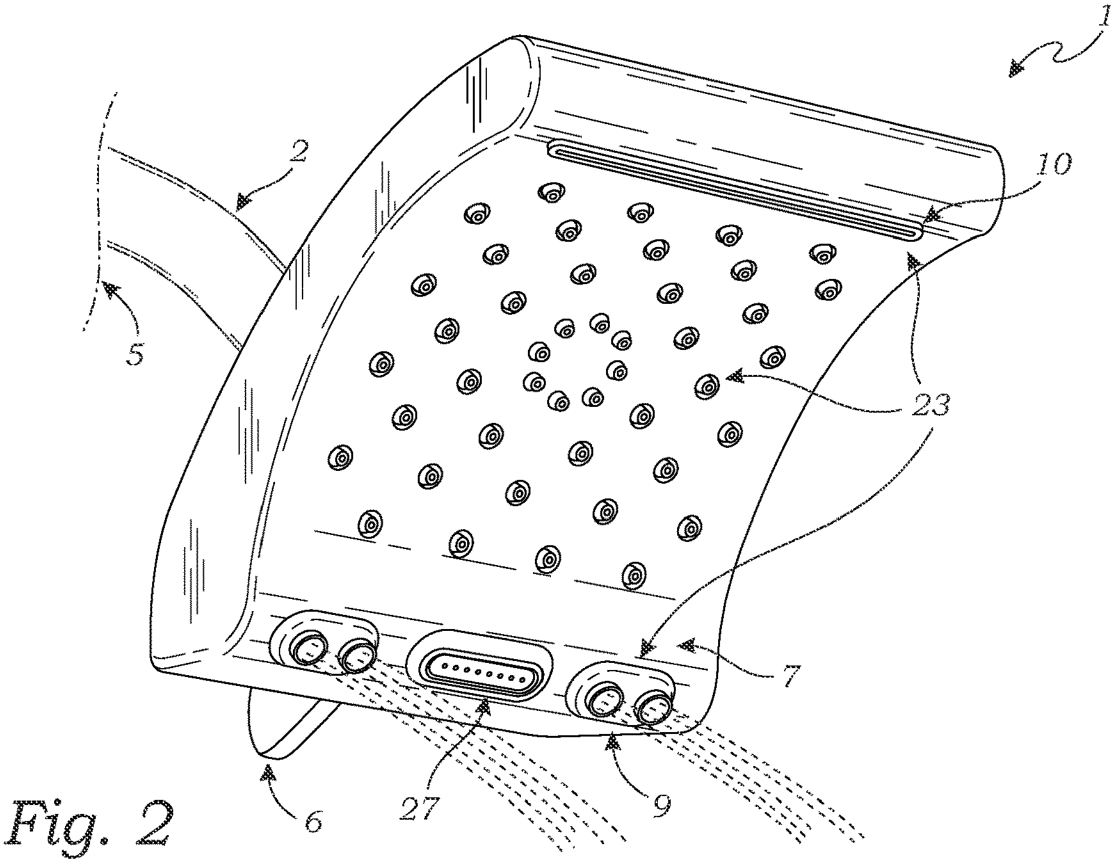
FIG. 2 is a left perspective view of the showerhead assembly illustrated in FIG. 1 wherein the supplemental non-oscillating nozzles are expelling water.
Figure 3:
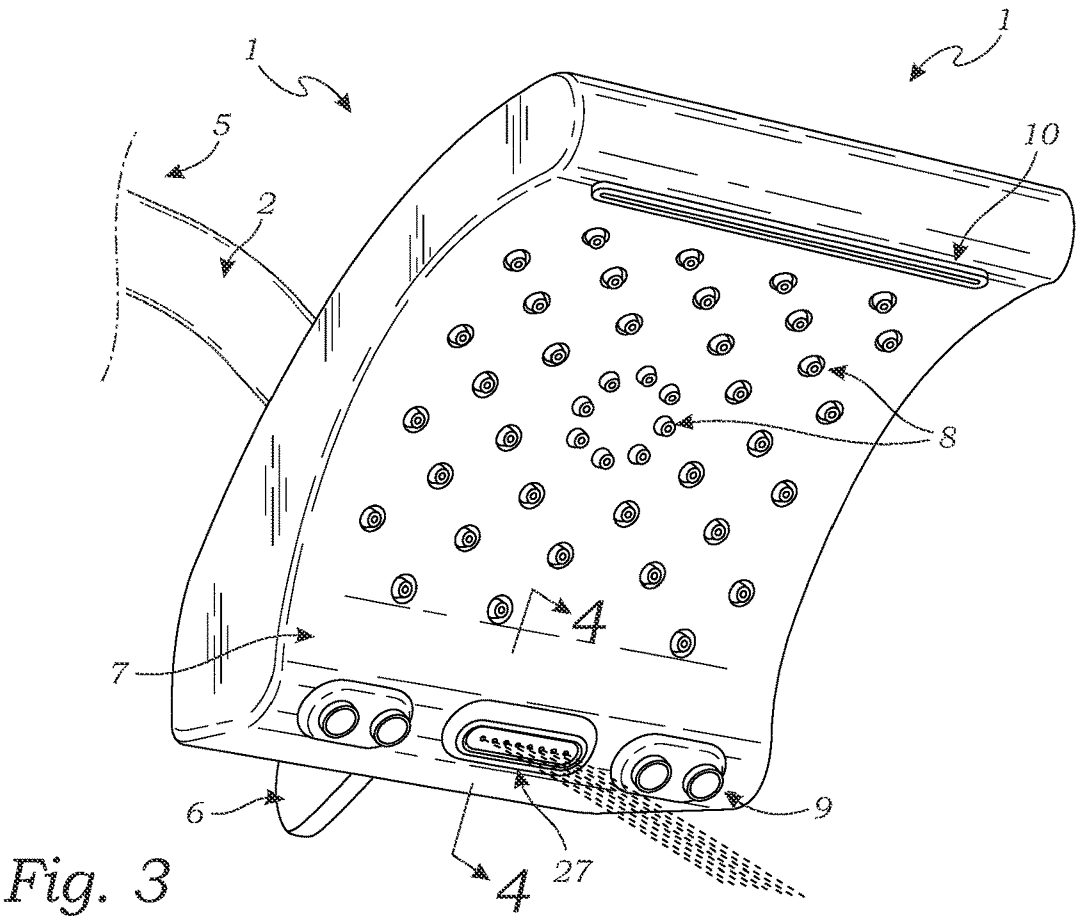
FIG. 3 is a left perspective view of the showerhead assembly illustrated in FIG. 1 wherein the oscillating nozzle is expelling water at its midpoint range of motion.
Figure 4:
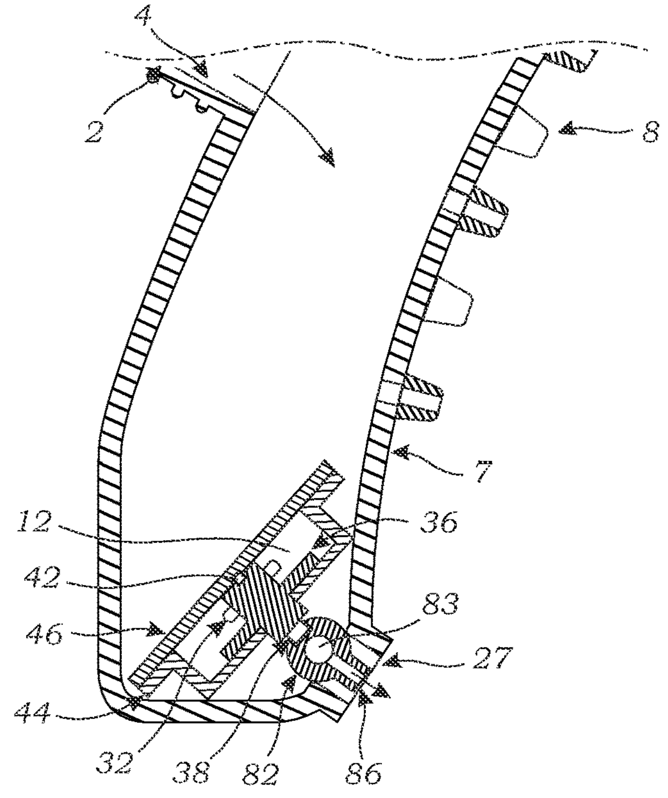
FIG. 4 is a left side cutaway view of the showerhead assembly illustrated in FIG. 1 wherein the compound gear mechanism is housed within the showerhead housing, illustrating the flow of water from the conduit through the gear train, whereby water is released into the nozzle chamber system and ejected from the oscillating nozzle outlet at its midpoint range of motion.
Figure 5:
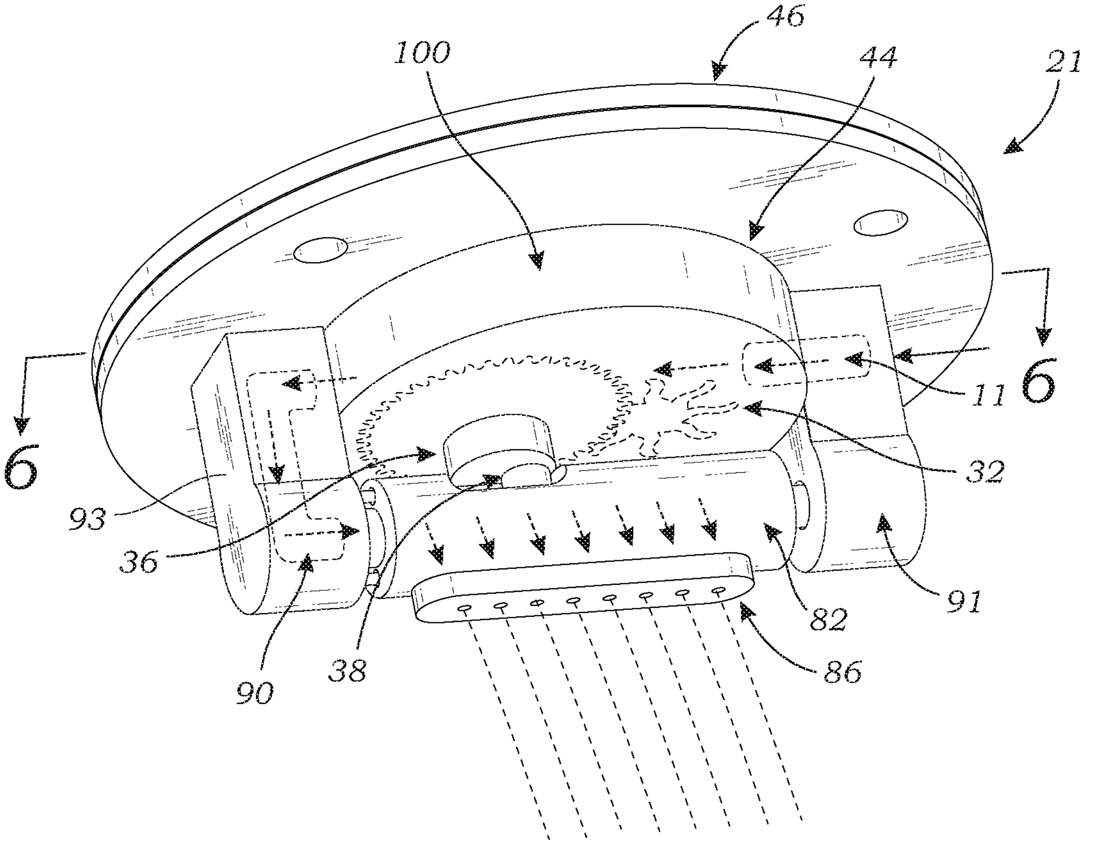
FIG. 5 is a perspective view of the compound gear mechanism illustrated in FIG. 4 illustrating gear train adjoined to the nozzle chamber system and the flow of water from the gear train through nozzle chamber system, whereby such water is ejected from the oscillating nozzle outlet at its midpoint range of motion.
Figure 6:
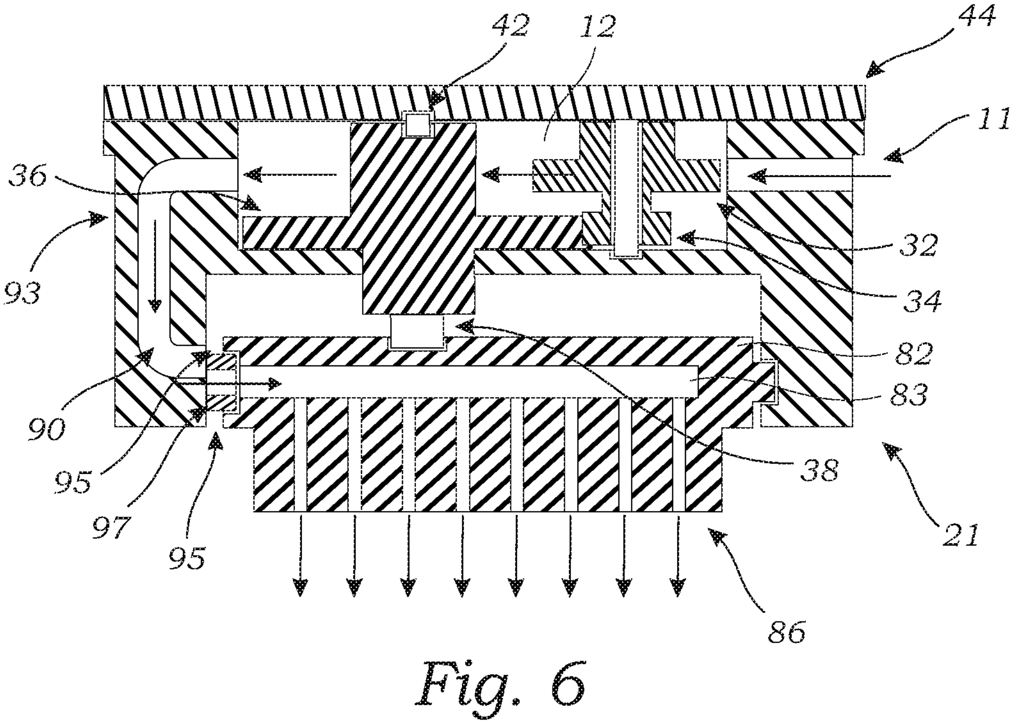
FIG. 6 is a perspective cutaway view of the compound gear mechanism illustrated in FIG. 4 illustrating the flow of water through the gear train and nozzle chamber system, wherein water is ejected from the oscillating nozzle outlet at its midpoint range of motion.
Figure 7:
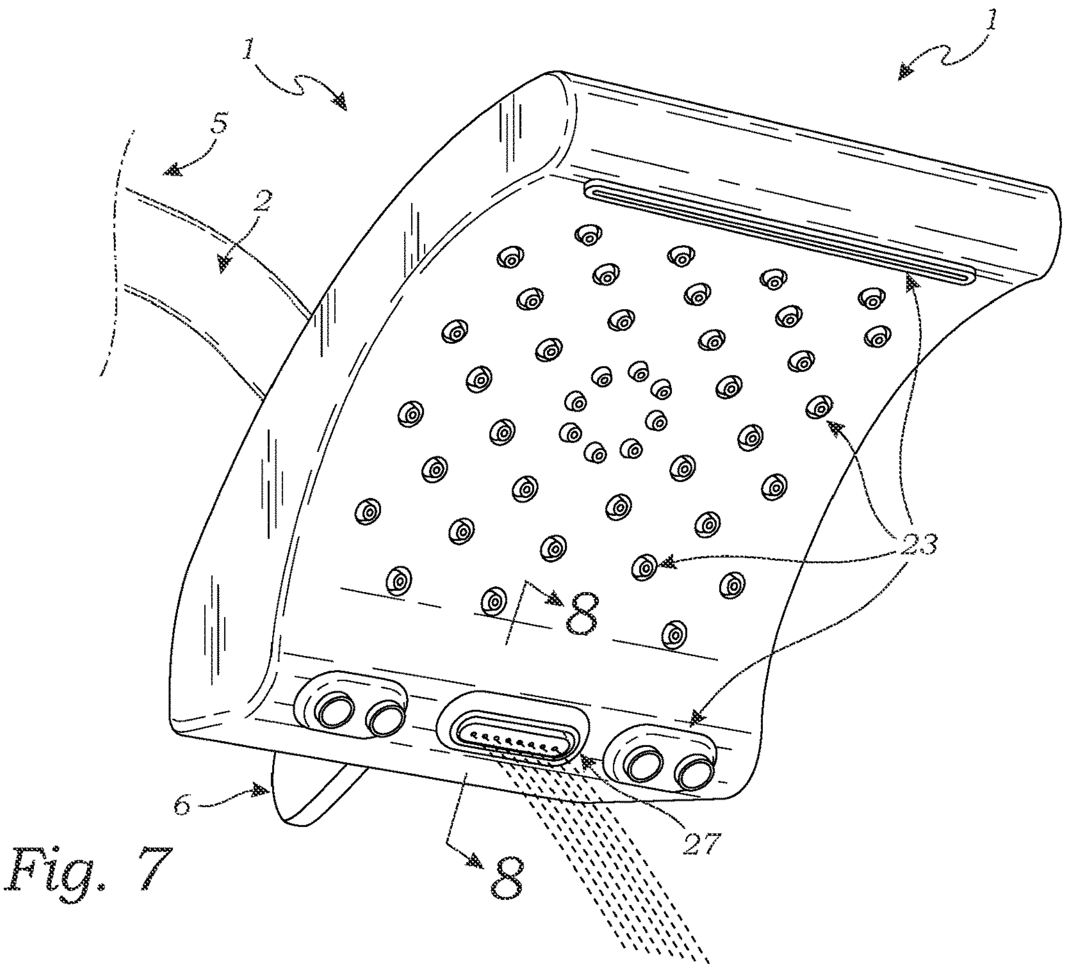
FIG. 7 is a left perspective view of the showerhead assembly illustrated in FIG. 1 wherein the oscillating nozzle is expelling water at a downward angle.
Figure 8:
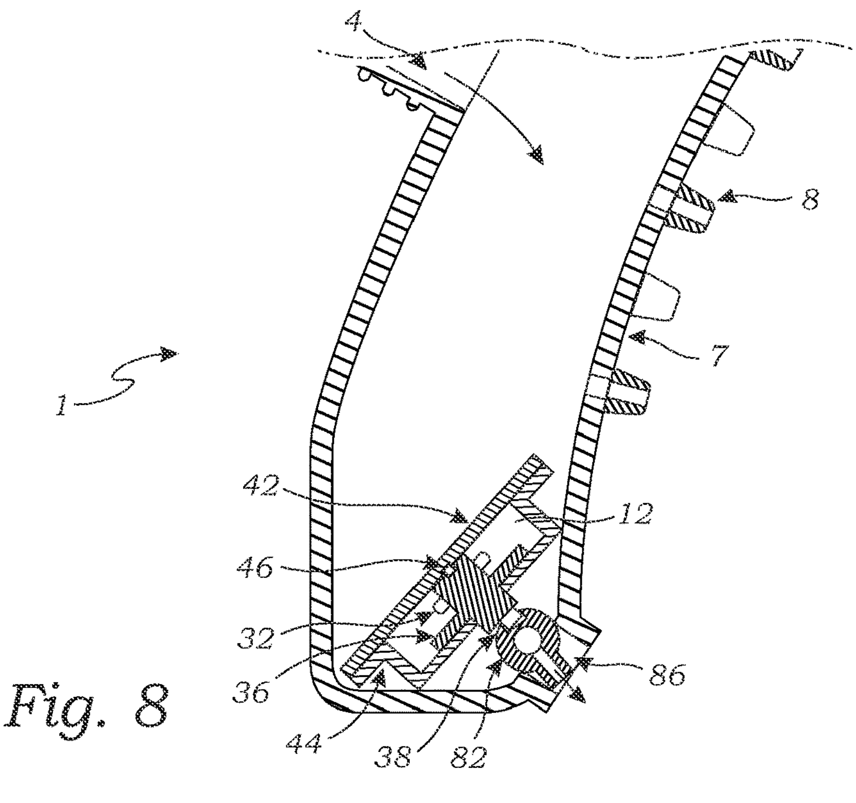
FIG. 8 is a left side cutaway view of the showerhead assembly illustrated in FIG. 1 wherein the compound gear mechanism is housed within the showerhead housing, illustrating the flow of water from the conduit through the gear train, whereby water is released into the nozzle chamber system and ejected from the oscillating nozzle outlet at a downward angle.
Figure 9:
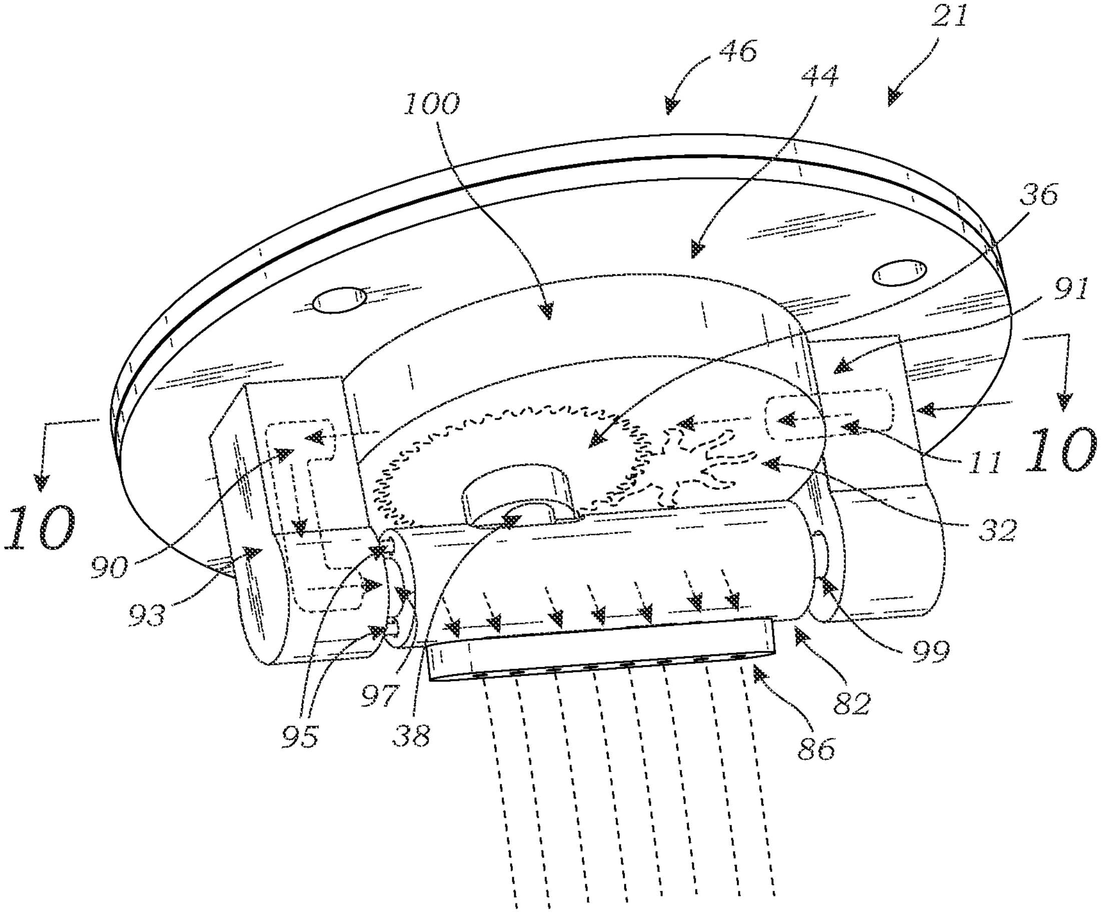
FIG. 9 is a perspective view of the compound gear mechanism illustrated in FIG. 4 illustrating gear train adjoined to the nozzle chamber system and the flow of water from the gear train through nozzle chamber system, whereby such water is ejected from the oscillating nozzle outlet at a downward angle.
Figure 10:
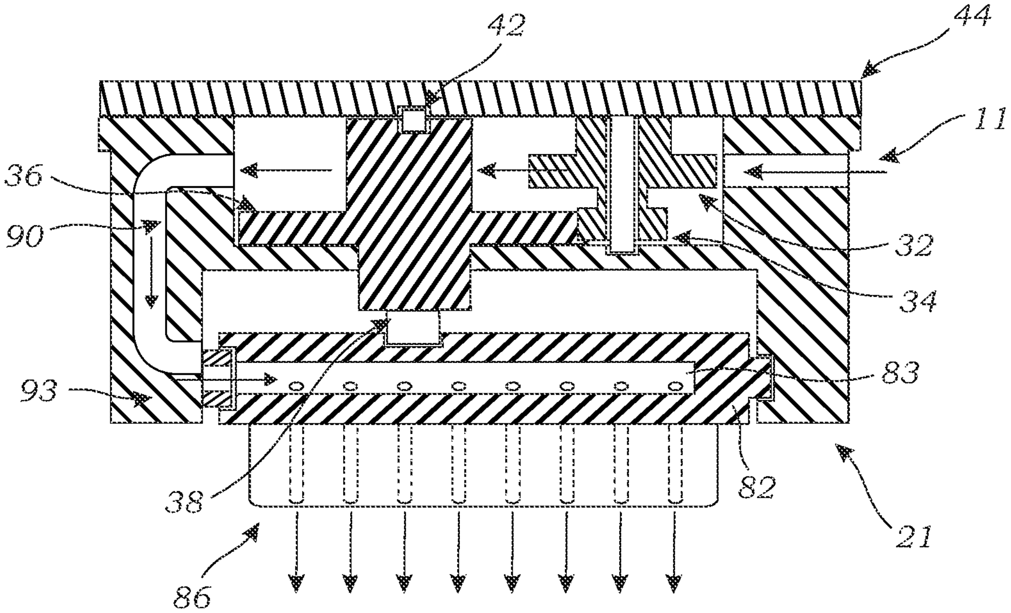
FIG. 10 is a perspective cutaway view of the compound gear mechanism illustrated in FIG. 4 illustrating the flow of water through the gear train and nozzle chamber system, wherein water is ejected from the oscillating nozzle outlet at a downward angle.
Figure 11:
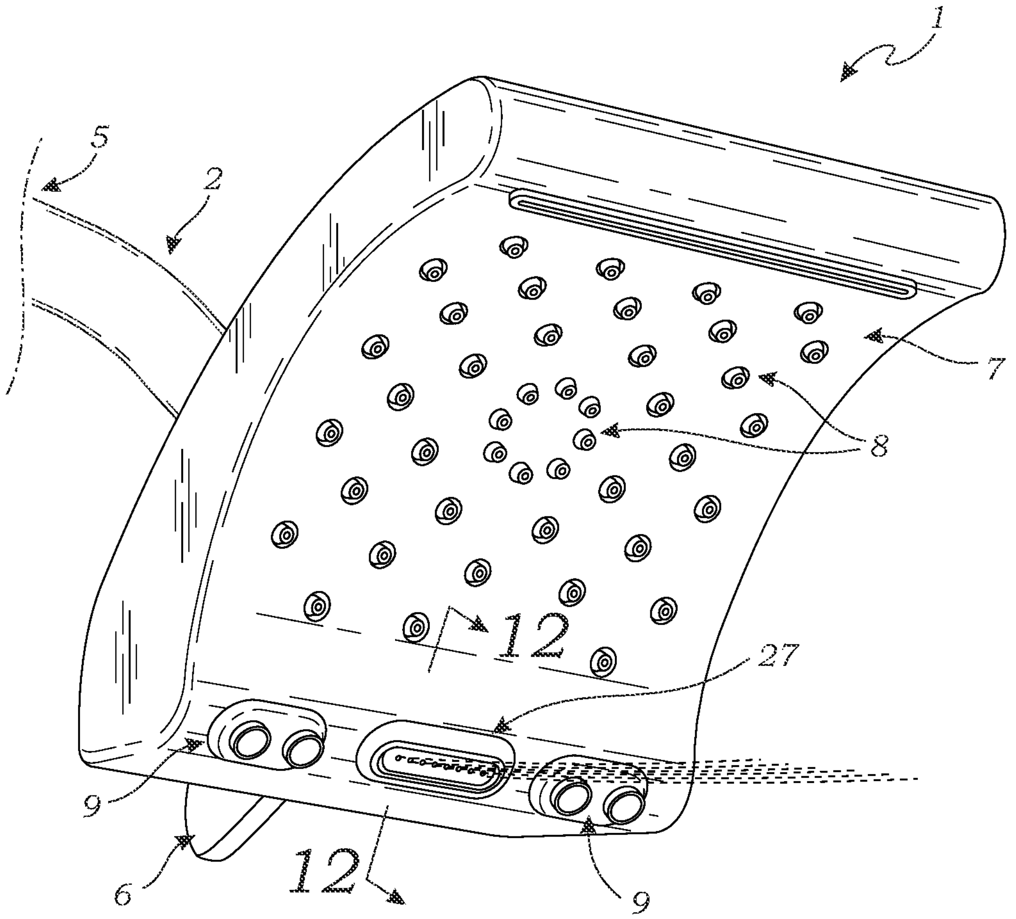
FIG. 11 is a left perspective view of the showerhead assembly wherein the oscillating nozzle is expelling water at an upward angle.
Figure 12:
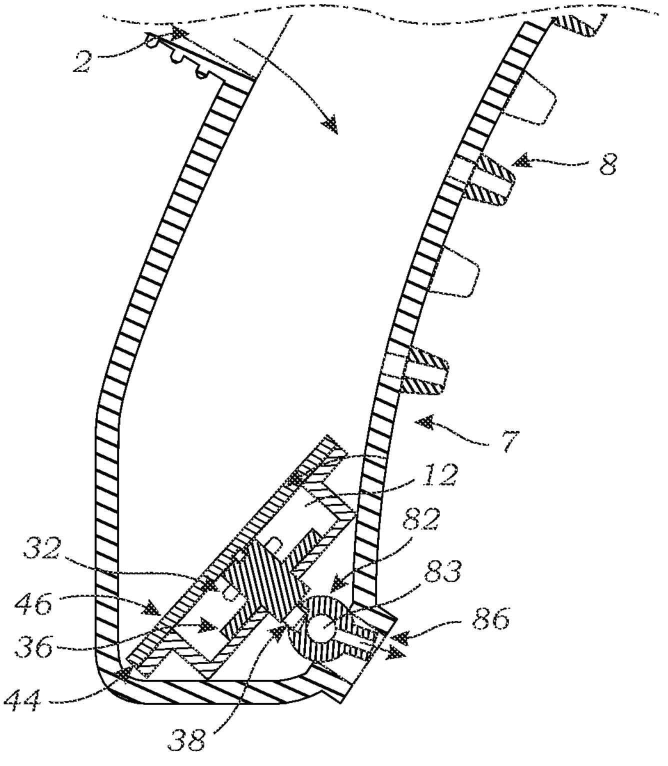
FIG. 12 is a left side cutaway view of the showerhead assembly illustrated in FIG. wherein the compound gear mechanism is housed within the showerhead housing, illustrating the flow of water from the conduit through the gear train, whereby water is released into the nozzle chamber system and ejected from the oscillating nozzle outlet at an upward angle.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-27, the oscillating nozzle 27 of the present invention is illustrated as a showerhead assembly 1 which includes three primary components including: a fluid conduit 2, a gear train 30, and an oscillating nozzle chamber system 80. In addition, the showerhead assembly 1 may include a face 7 that projects primary nozzles 8 and any number of supplementary nozzles 9. Further, the supplementary nozzles 9 may include any combination of oscillating nozzles 27 and/or non-oscillating nozzles 23. For example, in FIGS. 1-3, 7 and 11, the showerhead face 7 includes primary nozzles 8, oscillating nozzles 27, non-oscillating nozzles 23, and a supplemental nozzle 9 in the form of a slot nozzle 10. Preferably, the showerhead face 7 includes various types of nozzle sets in combination with the oscillating nozzle 27 so as to provide a more unique shower experience for the user. Further, both the oscillating nozzle 27 and non-oscillating nozzles 23 are embedded in a showerhead's face 7 and are in fluid connection with the conduit 2.

The showerhead may be any type as can be determined by one skilled in the art including fixed, handheld, or a combination thereof. However, for purposes of illustration only, a preferred showerhead assembly 1 includes a neck portion 6 which houses the conduit 2 and is connected to a water source 5. Further, the conduit 2 includes an inlet 4 threadably affixed to the water source pipe. The inlet 4 receives water from the water source 5 and transports such water to the inner chamber of the showerhead face 7 so as to convey such water to oscillating nozzles 27 and non-oscillating nozzles 23. Particularly, the inlet 4 transports water to a water passageway 11 upstream, directly adjacent to and in fluid connection with the gear train 30.

Still with reference to the exemplar embodiments depicted in FIGS. 1-27, the gear train 30 includes three gear portions: a propeller 32, a toothed pinion 34, and a large toothed gear 36. Specifically, water flows through one or more water passageways 11 into a cavity 12. The water then passes through the propeller 32, thereby causing the propeller 32 to rotate in a counterclockwise direction. Even more specifically, the pinion 34 extends co-axially from the propeller 32 and rotates in a counter-clockwise direction upon counter-clockwise rotation of the propeller 32. Additionally, the toothed gear 36 is in toothed engagement with the pinion 34 so as to rotate by rotation of the pinion. Specifically, the toothed gear 36 revolves in a clockwise direction as the pinion 34 rotates counterclockwise, and water continues to flow through the entirety of the gear train 30. More specifically, a pin is seated on the outer surface of the toothed gear. The pin is offset to the toothed gear's central axis which causes the pin to rotate in a circular path as a result of the rotation of the toothed gear. The pin is configured to move in a same direction as the toothed gear. Of course, those skilled in the art would understand that the gear train may be constructed to provide clockwise rotation of the propeller and toothed pinion, and counterclockwise rotation of the toothed gear and pin. Thus, the direction that the gears spin is not intended to limit the present invention.

Further, in the preferred embodiments, and as best depicted in FIGS. 4, 6, 8, 10, 15, and 18-23, the three wheel portions are mounted by arbors 42 onto a gear housing 100 so as to allow the gear train 30 to rotatably pivot as water passes through the compound gear mechanism 21. Further, the gear housing 100 includes a front plate 44 and a back plate 46. Preferably, the front plate 44 is appended to a back plate 46 which forms the cover of the three wheel gear mechanism 21. In some preferred embodiments, and as best illustrated in FIGS. 9, 13, 15, and 16, the front plate and back plate are circular in shape. In some preferred embodiments, and as illustrated in FIGS. 18-23, the front plate and back plate are rectangular in shape. Those skilled in the art would understand that various other shapes and constructions of the front plate and back plate can be provided without departing from the scope of the invention.

Figure 13:
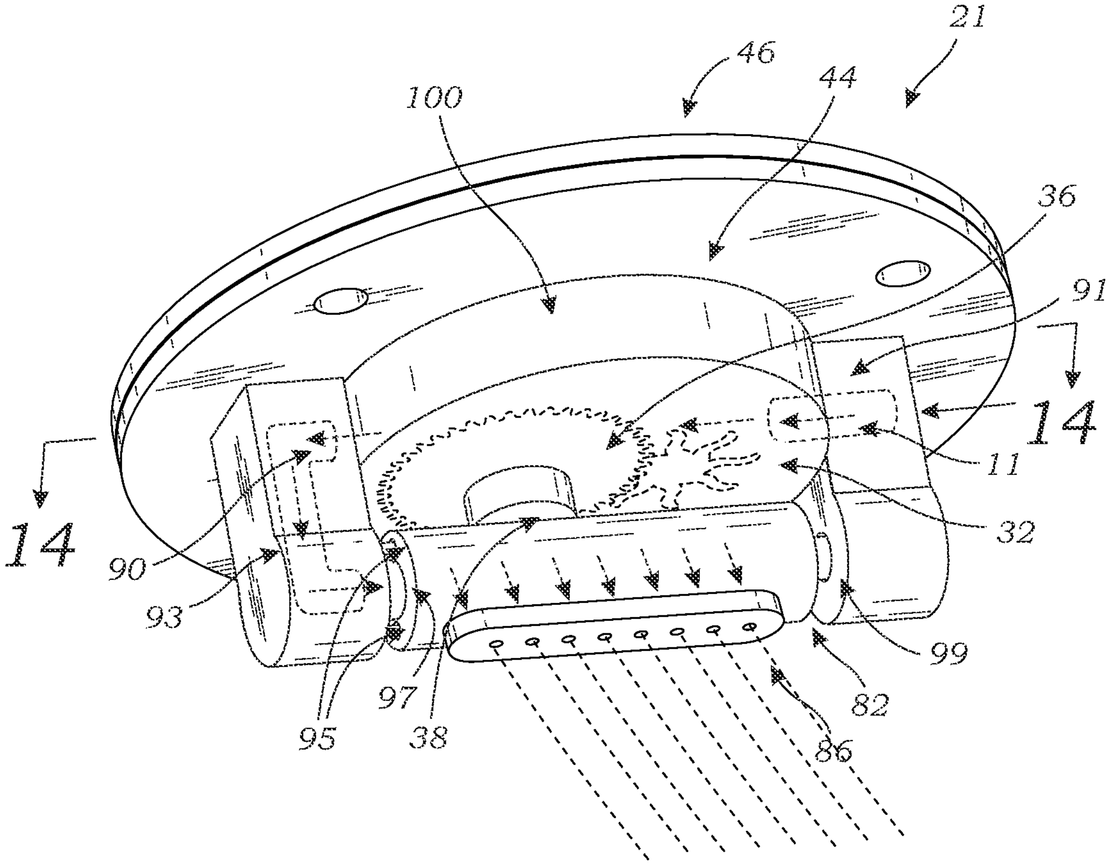
FIG. 13 is a perspective view of the compound gear mechanism illustrated in FIG. 4 illustrating gear train adjoined to the nozzle chamber system and the flow of water from the gear train through nozzle chamber system, whereby such water is ejected from the oscillating nozzle outlet at an upward angle.
Figure 14:
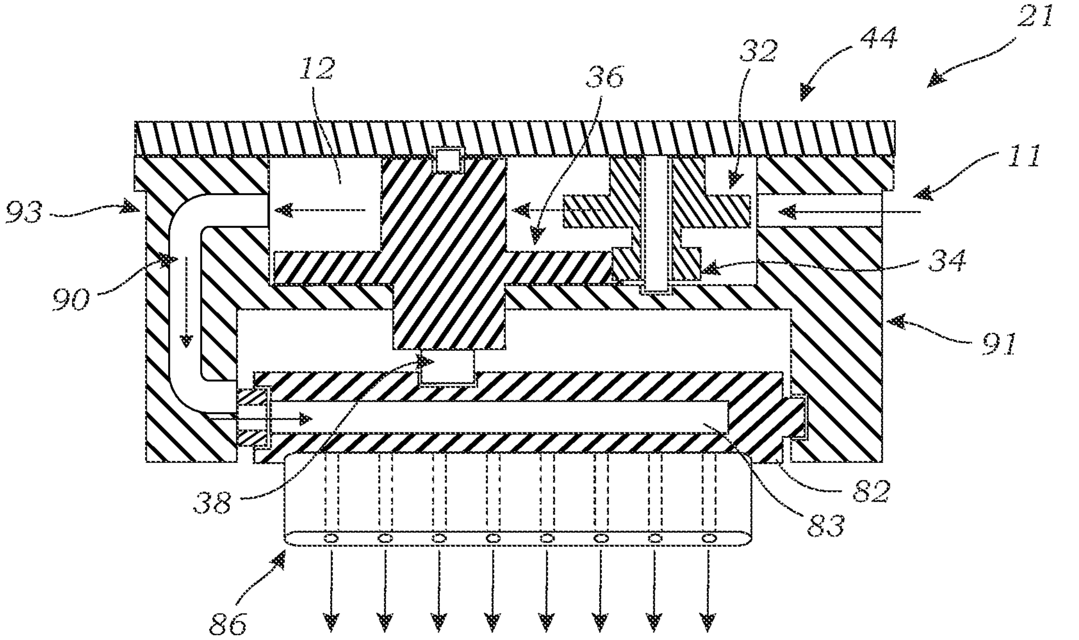
FIG. 14 is a perspective cutaway view of the compound gear mechanism illustrated in FIG. 4 illustrating the flow of water through the gear train and nozzle chamber system, wherein water is ejected from the oscillating nozzle outlet at an upward angle.
Figure 15:
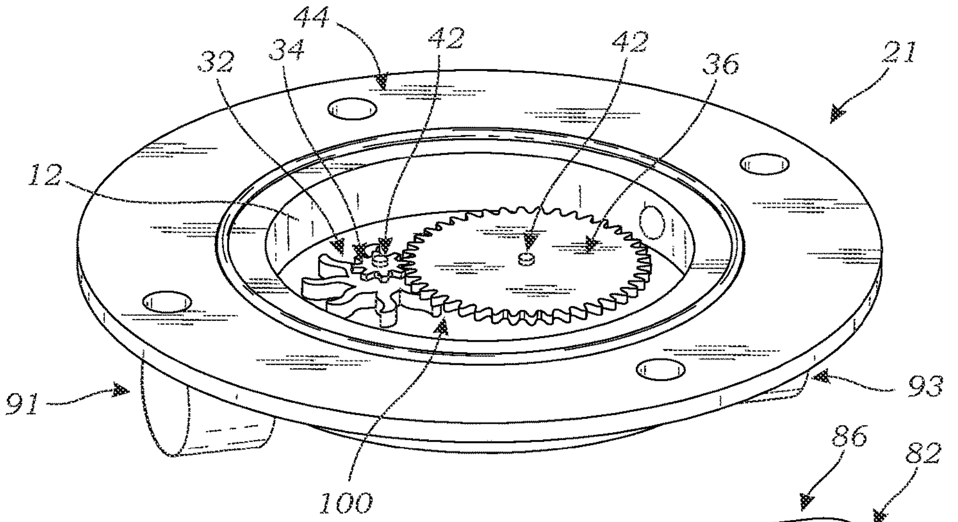
FIG. 15 is a bottom perspective view of the compound gear mechanism illustrated in FIG. 4 illustrating the layout of the gear train affixed to the front plate.
Figure 16:
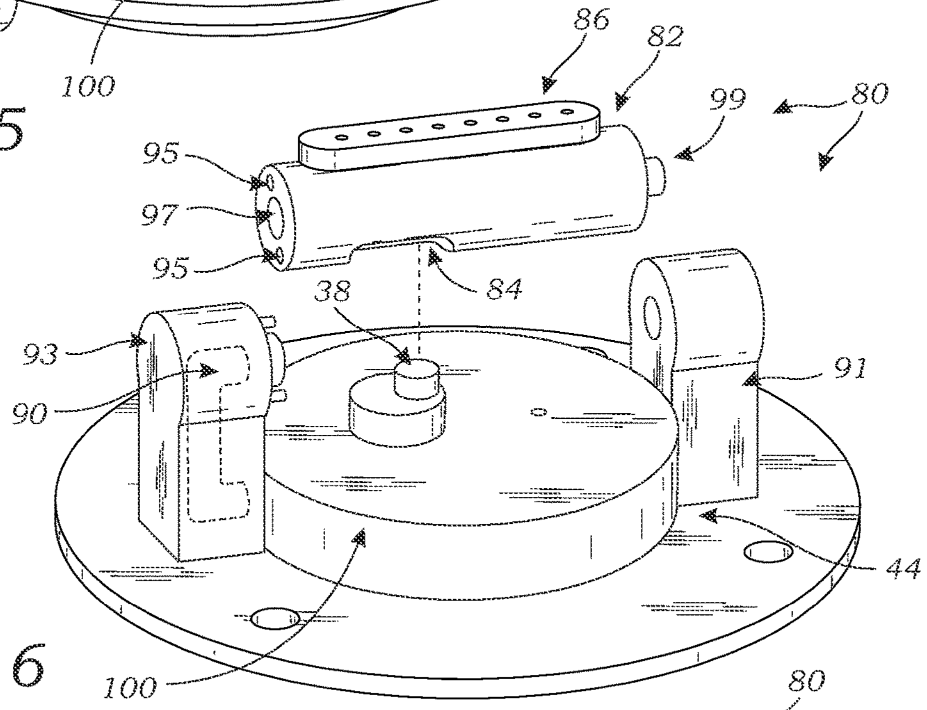
FIG. 16 is a partially exploded top view of the compound gear mechanism illustrated in FIG. 4 illustrating the nozzle chamber's pin slot which seats the pin residing on the large gear of the gear train.
Figure 17:
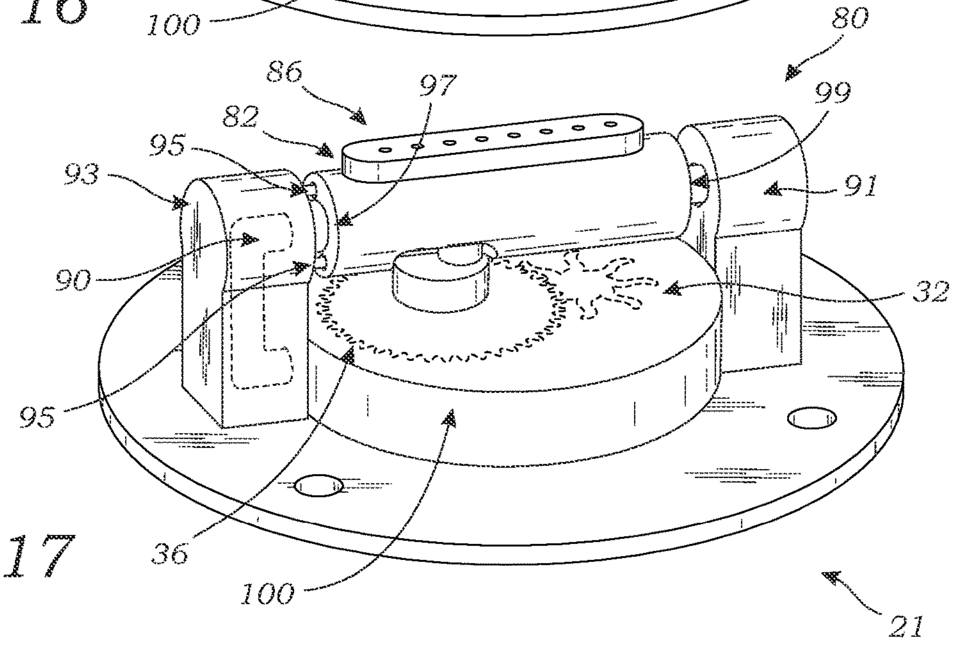
FIG. 17 is a top view of the compound gear mechanism illustrated in FIG. 4 illustrating the layout of the gear train and nozzle chamber system.

A First Embodiment of a Showerhead Assembly with a Compound Gear Mechanism and Oscillating Nozzle Chamber System With reference to FIGS. 4-6, 8-10, and 12-71, an exemplar embodiment of a showerhead assembly 1 comprising a gear train 30 and an oscillating nozzle chamber system 80 is shown. In the exemplar embodiment, and as best depicted in FIGS. 13, 16, and 17, the oscillating nozzle chamber system 80 includes two shoulder arms 91, 93 and a cylindrical nozzle housing 82 having a central chamber 83. Preferably, the pin 38 is seated on the surface of the large toothed gear 36 and engages with the pin slot 84 located on the cylindrical nozzle housing 82 so as to work in concert with the nozzle chamber system 80, ultimately leading to the nozzle's 27 oscillating motion. Specifically, as the large toothed gear 36 rotates, the pin 38 oscillates 450 back and forth within the pin slot 84. More specifically, the oscillating movement of the pin 38 causes the nozzle housing 82 to rotate.

Moreover, water passes through the nozzle chamber system 80. The nozzle chamber system 80 is comprised of a right solid shoulder arm 91 and a left hollow shoulder arm 93. The left hollow shoulder arm 93 houses a central channel 90 which receives water from the cavity 12. Further, the right shoulder arm 91 functions as a support arm for the nozzle housing 82. Notably, the two shoulder arms 93, 91 hold the nozzle housing 82 in position along a longitudinal axis so as to prevent horizontal movement as water sprays out of the oscillating nozzle chamber's outlet 86.

In the preferred embodiment, the nozzle housing 82 includes a first end and a second end. Additionally, two spindles 95 encircle the exit of the central channel 90 and adjoin the left shoulder arm 93 to the nozzle housing 82 by the first end. Specifically, the two spindles 95 include a bearing 97 and rotate between ten degrees and thirty degrees in an upward and downward trajectory upon movement of the nozzle housing 82 caused by the pivoting of the pin 38 in the pin slot 84. More specifically, the pin's 38 movement causes the ten-to-thirty-degree vertical oscillation of the two spindles 95.

Also preferably, the right shoulder arm 91 is adjoined to the second end of the nozzle housing 82 by way of an axle 99. Specifically, and as a result of the pin 38 pivoting within the pin slot 84 and causing the nozzle housing 82 to rotate, the axle 99 oscillates between ten degrees and thirty degrees upwardly and downwardly upon a vertical axis. Importantly, the oscillating pin 38 forces the nozzle housing 82 to pivot back and forth with a rotation between ten and twenty degrees while the two shoulder arms 93, 91 hinder the nozzle housing's 82 horizontal movement. Further, the pin system, in combination with the functions of the shoulder arms 25, restricts the nozzle housing's 82 movement along a vertical axis so as to generate the reciprocating motion of the nozzle housing 82.

As illustrated in FIGS. 5-6, 9-10, and 13-14, a nozzle outlet 86 extends from the nozzle housing 82. As water from the central channel 90 enters the nozzle housing's central cavity 83, it is ejected out through the nozzle outlet 86. As a result of the reciprocating motion of the nozzle housing 82 caused by the oscillating pin 38, such water disperses out of the nozzle outlet 86 in an oscillating spray pattern.

Preferably, and as illustrated in FIGS. 12-17, the cavity 12 is substantially larger than the diameter of the propeller 32, pinion 34, and large toothed gear 36. This disparity in size provides a space around the gear train 30 through which water can flow. The additional space is provided to account for bathers who attempt to physically hold the cylindrical nozzle chamber 82 in a fixed position. Without this additional space, water flow would be completely blocked which could result in a build-up of water pressure that could damage the internal components of the showerhead. Instead, if movement of the cylindrical nozzle housing 82 is impeded, water continues to flow around the propeller 32, pinion 34 and large toothed gear 36, and then through the central channel 90 to the nozzle housing's central cavity 83. Thus, even though the movement of the nozzle housing is impeded, water is still ejected out through the nozzle outlet 86. Once the nozzle housing's movement is once again unobstructed, the oscillating motion starts again. Moreover, the preferred embodiment has a nozzle housing 82 that rotates about a horizontal axis so as to provide a spray that oscillates up and down. However, the nozzle housing may be oriented in any direction, such as vertically to provide a spray that oscillates side-to-side.

Figure 18:
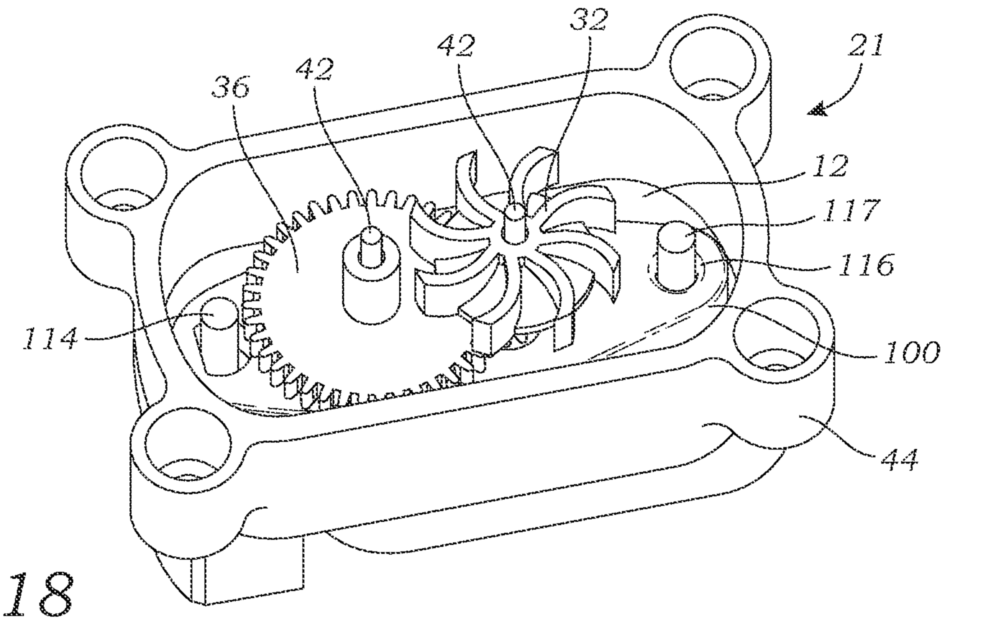
FIG. 18 is a bottom perspective view illustrating an exemplar embodiment of a compound gear mechanism of a showerhead assembly.
Figure 19:
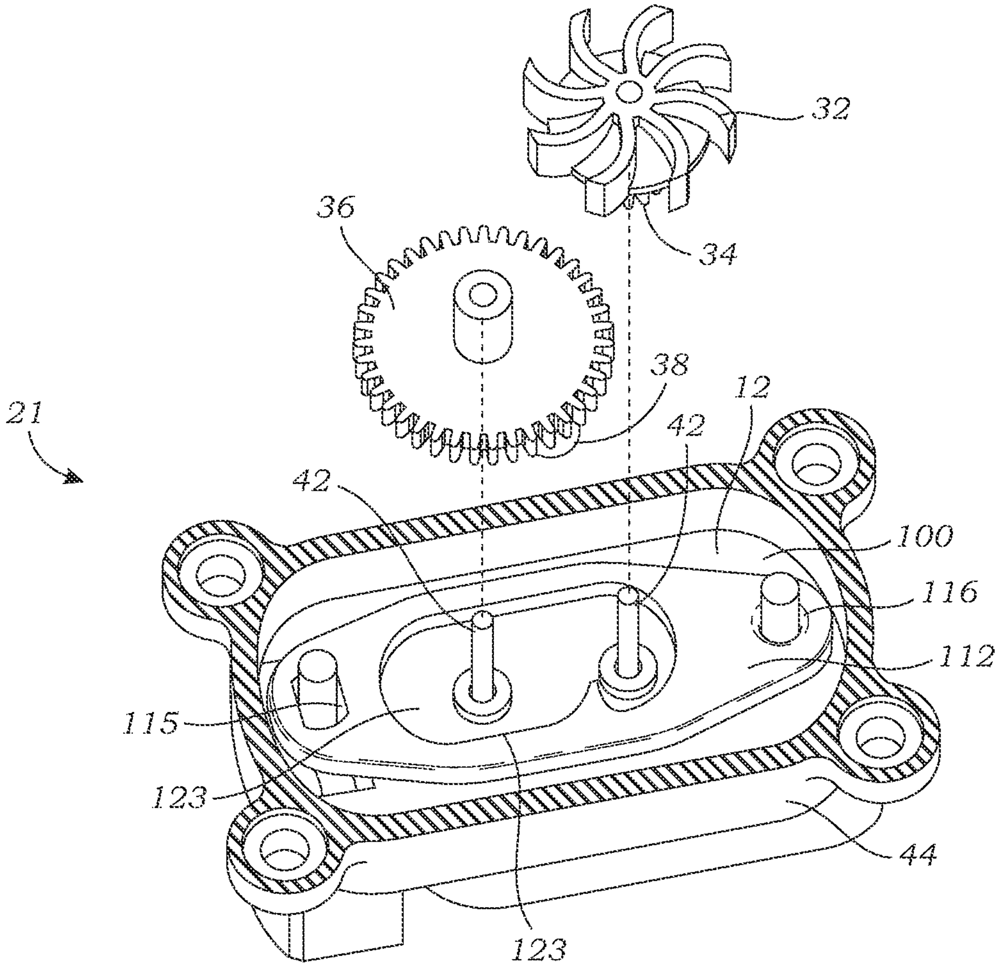
FIG. 19 is a partially exploded bottom view of the compound gear mechanism illustrated in FIG. 18.
Figure 20:
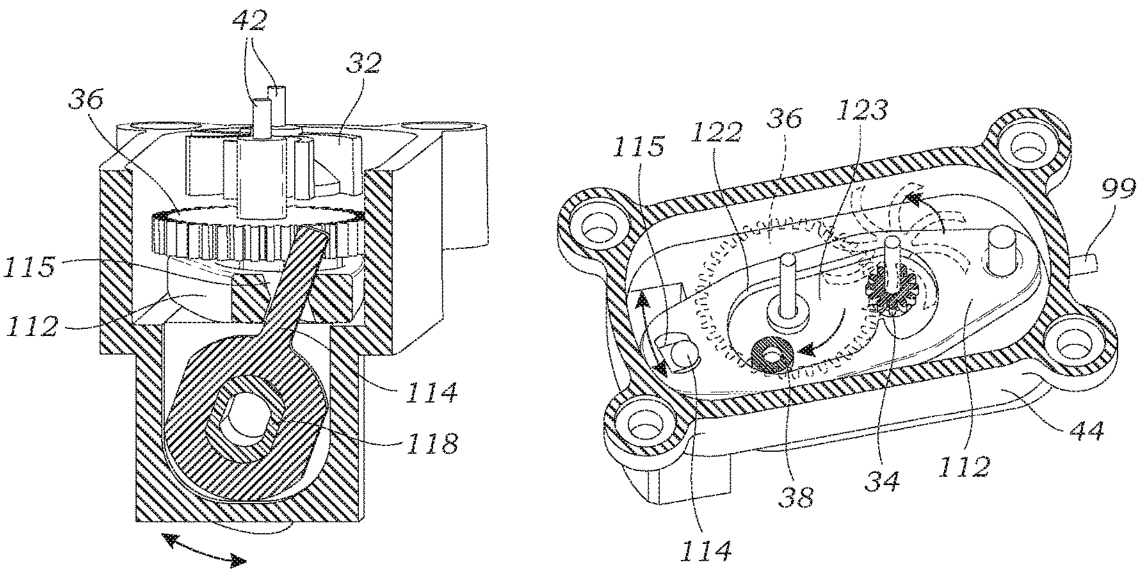
FIG. 20 is a side cutaway view and bottom cutaway view of the compound gear mechanism depicted in FIG. 18, illustrating the propeller rotating in a counterclockwise direction, the toothed gear and pin rotating in a clockwise direction, and the lever swinging to a first side.
Figure 21:
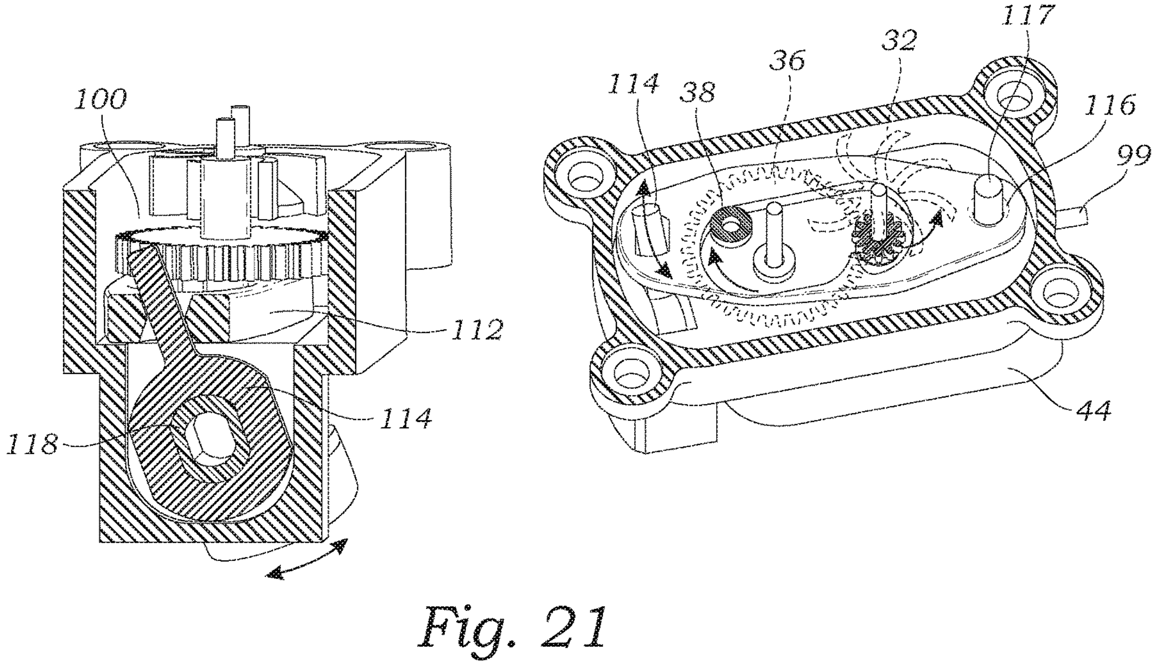
FIG. 21 is a side cutaway view and bottom cutaway view of the compound gear mechanism depicted in FIG. 18, illustrating the propeller rotating in a counterclockwise direction, the toothed gear and pin rotating in a clockwise direction, and the lever swinging to a second side.

A Second Embodiment of a Showerhead Assembly with a Compound Gear Mechanism and Oscillating Nozzle Chamber System FIGS. 18-27 depict an additional exemplar embodiment of a showerhead assembly 1 with a gear train 30 and an oscillating nozzle chamber system 80. The embodiment described in FIGS. 18-27 is similar to the embodiment depicted in FIGS. 4-6, 8-10, and 12-17, except that the embodiment depicted in FIGS. 18-27 includes a rocker plate 112 and a swinging lever 114 instead of a pin slot. Preferably, the rocker plate 112 is disposed within the gear housing 100. More preferably, the rocker plate 112 is mounted on the gear housing 100 in the front plate 44. Even more preferably, the rocker plate 112 comprises a first aperture 115 and a second aperture 116, wherein the first aperture 115 is sized configured for receipt of the lever 114 and the second aperture 116 is sized and configured for receipt of a fixed support rod 117. Specifically, and as best shown in FIGS. 20 and 21, the lever 114 is operatively coupled with a fulcrum bar 118 and is configured to swing back and forth within the first aperture 115 in response to a force exerted by the rocker plate 112 as the rocker plate 112 pivots within a horizontal plane. In this regard, the fulcrum bar 118 defines the lever's 114 axis of rotation, and the first aperture's 115 size and dimension defines a maximum trajectory of the lever 114 as it swings from a first side to a second side. Further, the support rod 117 is configured to secure the rocker plate 112 on the front plate 44 and define an axis of rotation for the rocker plate 112 as it pivots along the horizontal axis. In preferred embodiments, the rocker plate 112 is configured to move side to side (e.g., left to right). However, those of skill in the art will recognize that the rocker plate 112 can move in any direction, such as in an up and down direction, without departing from the scope of the invention.

Figure 24:
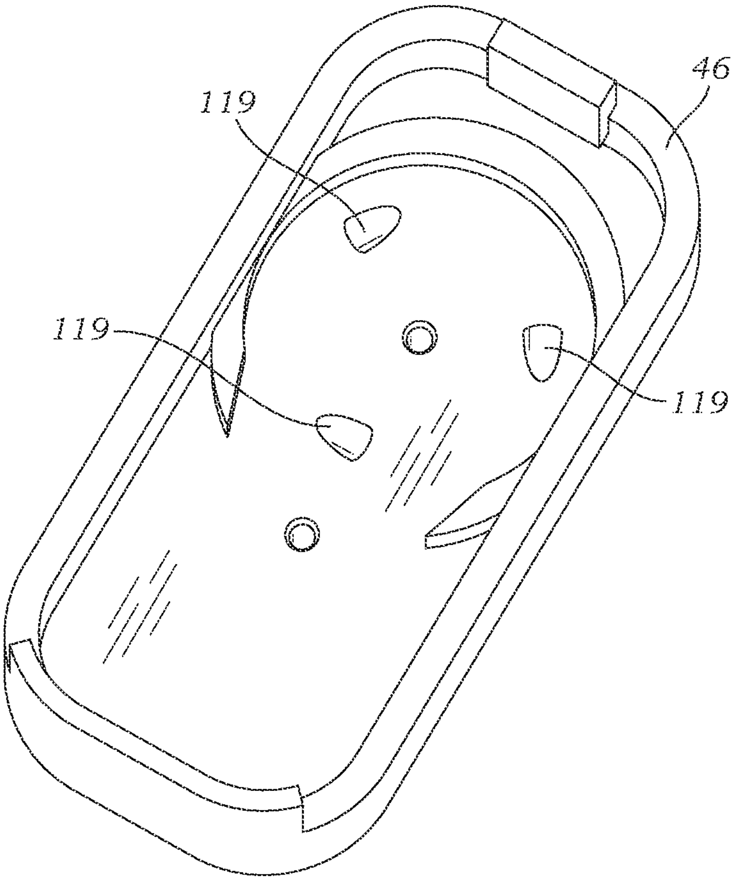
FIG. 24 is a front perspective view of an exemplar embodiment of a back plate.
Figure 25:
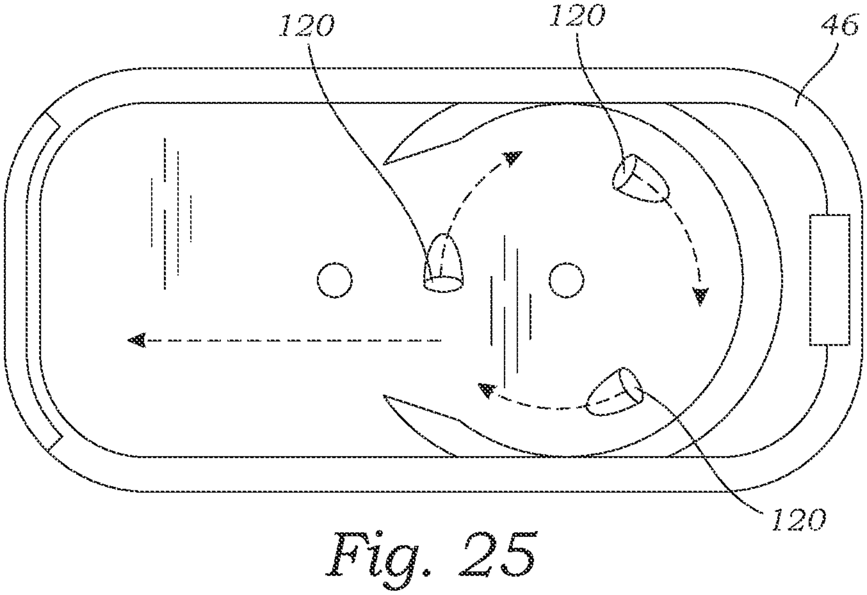
FIG. 25 is a front perspective view of the back plate depicted in FIG. 24, illustrating the flow of water through the water passageways.

In preferred embodiments, inlet 4 (illustrated in FIG. 8) transports water through one or more water passageways 11 upstream, directly adjacent to and in fluid connection with the gear train 30. More specifically, water flows through the one or more water passageways 11 into the cavity 12. Preferably the one or more water passageways 11 include one or more inlets 119 and corresponding outlets 120. More preferably, the one or more inlets 119 are angled inlets 120. Even more preferably, the one or more inlets 119 include three angled inlets 119. In the preferred embodiment, and as best depicted in FIGS. 24-25, the angled inlets 119 are formed on the back plate 46 so as to allow water to pass therethrough and into the cavity 12 and through the compound gear mechanism 21. In this way, water from the inner chamber of the showerhead face 7 is transported through the one or more angled inlet(s) 119 so as to travel downstream through the gear train 30 (i.e., to the propeller 32) at an angled trajectory (e.g., a counterclockwise direction), thereby causing rotation of the propeller 32.

Preferably, the pin 38 is seated on the surface of the toothed gear 36 and engages with the rocker plate 112 disposed within the gear housing 100. Specifically, and as best shown in FIGS. 19-21, the rocker plate 112 includes a pin engaging lip 122 along its inner perimeter, whereby the pin engaging lip 122 is configured to engage with the pin 38. Further, the pin engaging lip 122 defines an inner space 123 of the rocker plate 112. In the preferred embodiment, the arbors 42 extend through the inner space 123 (see, e.g., FIGS. 19-21) and are mounted in receiving structures on the front plate 44. In some embodiments, and as best shown in FIG. 18, the propeller 32 and toothed gear 36 are configured to extend outwardly relative to the pin engaging lip 122 and are positioned adjacent to and upstream of the rocker plate 112. Preferably, the pin 38 is positioned offset relative to the toothed gear's 36 central axis so that at least a portion thereof can engage with the rocker plate 112.

Specifically, as water flows through the propeller 32, thereby causing the propeller 32 and toothed pinion 34 to rotate, the toothed gear 36 rotates and causes the pin 38 to rotate in a circular path along the pin engaging lip 122. More specifically, the rotation of the pin 38 causes the rocker plate 112 to move or pivot along the horizontal axis. In this regard, as the pin 38 engages with the pin engaging lip 122 and causes the rocker plate 112 to move, the lever 114 swings from side to side, thereby causing the nozzle housing 82 to oscillate. As such, the compound gear mechanism 21 works in concert with the nozzle chamber system 80, ultimately leading to the nozzle's 27 oscillating motion.

Figure 22:
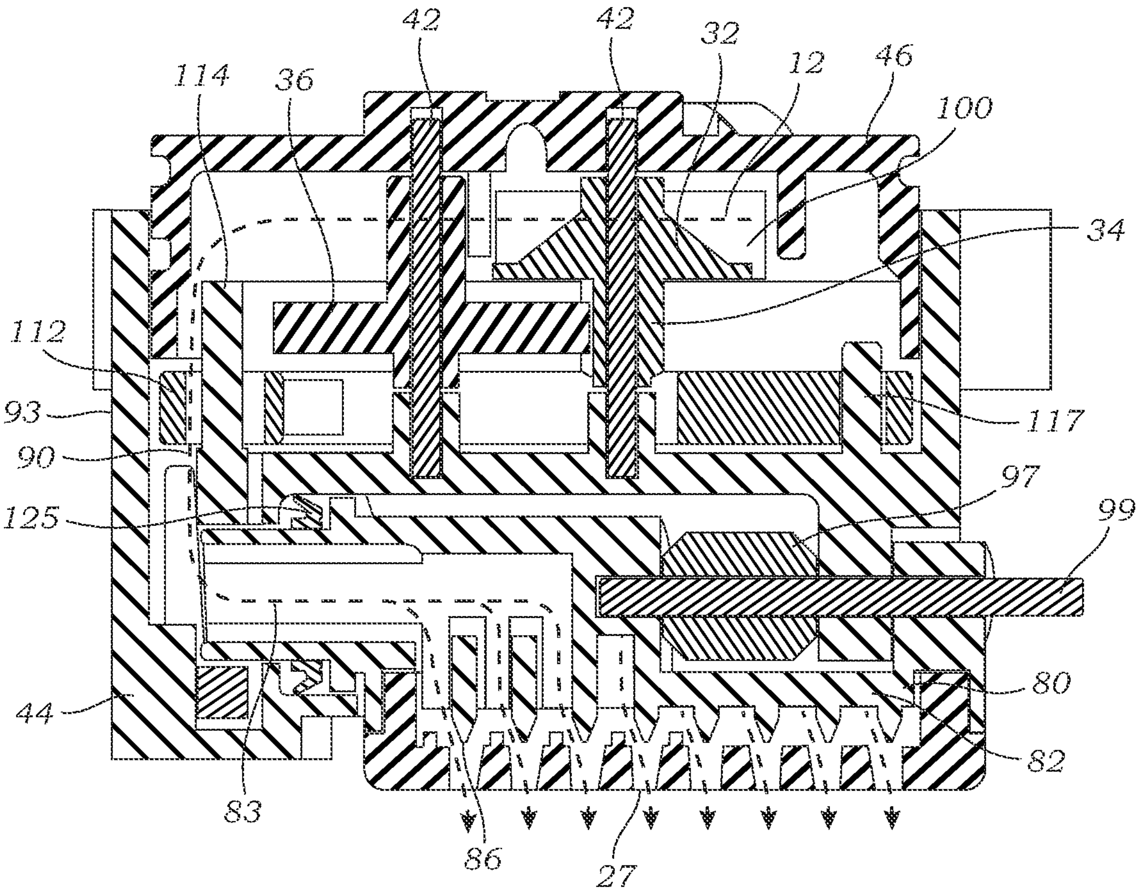
FIG. 22 is a side cutaway view of the gear housing and nozzle housing of the compound gear mechanism depicted in FIG. 18, illustrating the water passageway as water expels through the oscillating nozzles.
Figure 23:
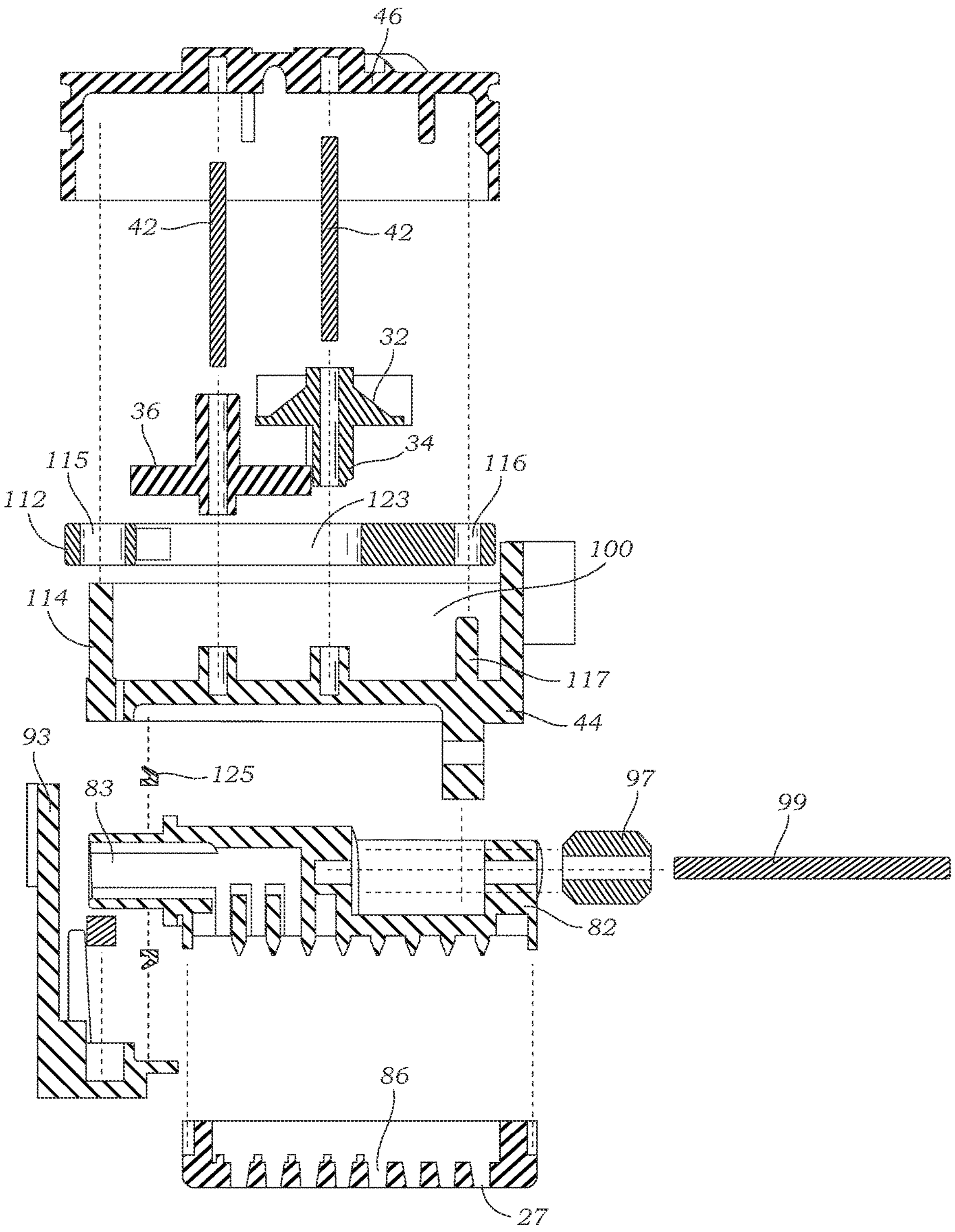
FIG. 23 is an exploded side view of the gear housing and nozzle housing depicted in FIG. 22.

Moreover, and similar to the embodiment described in FIGS. 4-6, 8-10, and 12-17, water passes through the oscillating nozzle chamber system 80. The oscillating nozzle chamber system 80 depicted in FIGS. 22-23 is similar to the oscillating nozzle chamber system 80 depicted in FIGS. 4-6, 8-10, 12-14, and 16-17, except that it includes one shoulder arm 93. In some preferred embodiments, and as illustrated in FIGS. 22-23, the shower assembly 1 comprises one hollow shoulder arm 93. The hollow shoulder arm 93 houses the central channel 90 which receives water from the cavity 12. Further, an axle 99 extends longitudinally through a portion of the nozzle housing 82 and the gear housing 100, and functions as a support structure for the nozzle housing 82. Preferably, the axle 99 extends through a side opposite the side of the shoulder arm 93. For example the shoulder arm 93 can be oriented along a left side of the gear housing 100 and nozzle housing 82, and the axle 99 can be oriented along a right side of the gear housing 100 and nozzle housing 82, or vice versa. Notably, the hollow shoulder arm 93 and axle 99 hold the nozzle housing 82 in position along a longitudinal axis so as to prevent horizontal movement as water sprays out of the oscillating nozzle chamber's outlet 86.

In the preferred embodiment, the nozzle housing 82 includes a first end and a second end. Additionally, and as best depicted in FIGS. 22-23, the axle 99 extends through a bearing 97 in the nozzle housing 82 and adjoins the shoulder arm 93 to the nozzle housing 82 by the first end. Specifically, the axle 99 rotates (e.g., between ten degrees and thirty degrees) in an upward and downward trajectory upon movement of the nozzle housing 82 caused by the pivoting of the pin 38 along the rocker plate 112 and oscillation of the lever 114.

Specifically, and as a result of the pin 38 pivoting along the rocker plate 112 and the lever 114 oscillating and causing the nozzle housing 82 to rotate, the bearing 97 oscillates (e.g., between ten degrees and thirty degrees) upwardly and downwardly upon a vertical axis. Importantly, the oscillating lever 114 forces the nozzle housing 82 to pivot back and forth with a rotation (e.g., between ten and twenty degrees) while the shoulder arm 93 and axle 99 hinder the nozzle housing's 82 horizontal movement. Further, the pin system, in combination with the functions of the shoulder arm 93 and axle 99 restrict the nozzle housing's 82 movement along a vertical axis so as to generate the reciprocating motion of the nozzle housing 82.

Figure 26:
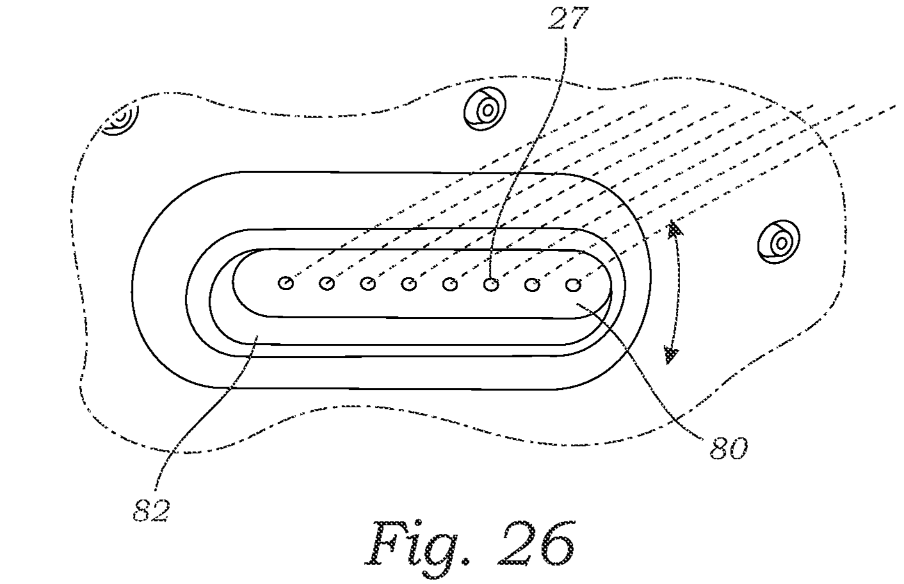
FIG. 26 is a front perspective view of the oscillating nozzle housing of a showerhead assembly, illustrating the nozzles angled in an upward direction and spraying water therefrom.
Figure 27:
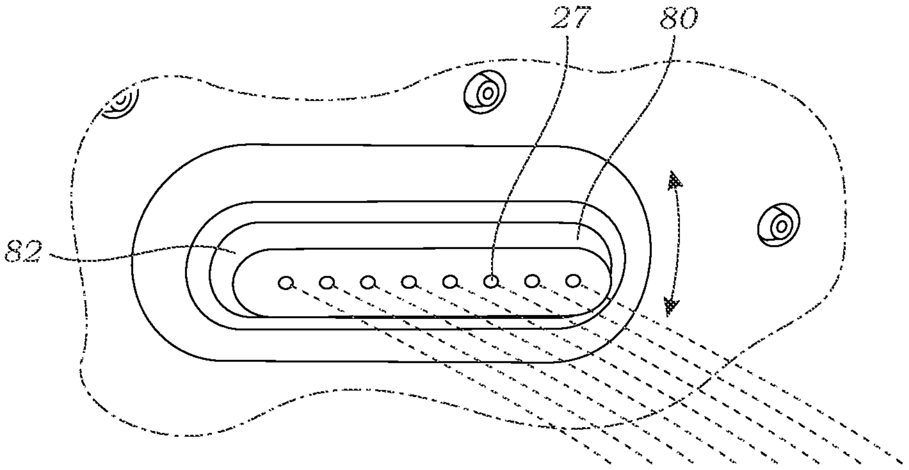
FIG. 27 is a front perspective view of the oscillating nozzle housing depicted in FIG. 26, illustrating the nozzles angled in a downward direction and spraying water therefrom.

Further, the nozzle chamber system 80 illustrated in FIGS. 22-23 includes a cylindrical nozzle housing 82 having a central chamber 83 in fluid communication with the central channel 90. As illustrated in FIGS. 22-23, a nozzle outlet 86 extends from the nozzle housing 82 and is in fluid communication with the central chamber 83. As water from the central channel 90 enters the nozzle housing's central chamber 83, it is ejected out through the nozzle outlet 86 (see, e.g., FIGS. 26-27). As a result of the reciprocating motion of the nozzle housing 82 caused by oscillating lever 114, such water disperses out of the nozzle outlet 86 in an oscillating spray pattern, as shown in FIGS. 26-27.

Preferably, and as best illustrated in FIGS. 18-22, the cavity 12 is substantially larger than the diameter of the propeller 32, pinion 34, and toothed gear 36. Moreover, the preferred embodiment has a nozzle housing 82 that rotates about a horizontal axis so as to provide a spray that oscillates up and down. However, the nozzle housing 82 may be oriented in any direction, such as vertically to provide a spray that oscillates side-to-side.

In some embodiments, the nozzle housing 82 can also comprise one or more sealing members 125, sealing rings, or mechanical gaskets, such as an O-ring (see, e.g., FIGS. 22-23). Specifically, one or more sealing members 125 can be around the central channel 90, upstream of the one or more oscillating nozzles 27. In this manner, the sealing member 125 (e.g., O-ring) mitigates or prevents water leaking from the showerhead assembly 1.

While preferred oscillating nozzles 27 and showerhead assemblies 1 have been illustrated and described, it would be apparent that various modifications of the oscillating nozzle 27 and showerhead assembly 1 can be made without departing from the spirit and scope of the invention. For example, the illustrated and described preferred embodiment is a fixed wall mounted showerhead. However, the oscillating spray assembly can be incorporated into any showerhead assembly including a hand-held construction. It will be understood by those of skill in the art that any of the showerhead assemblies described herein, are meant to be illustrative only, and that the individual elements, or any combination of elements, depicted and/or described for a particular embodiment or figure are freely combinable with any other element, or any combination of other elements, depicted and/or described with respect to any of the other embodiments.

Accordingly, it is not intended that the invention be limited except by the following claims.

Having described my invention in such terms to enable a person skilled in the art to understand the invention, recreate the invention, and practice it, and having identified the presently preferred embodiments thereof, I claim:

1. A water spraying assembly comprising:
an inlet;
a showerhead comprising a face and a neck portion with a central conduit in fluid connection with said inlet;
an oscillating nozzle assembly including a nozzle housing having a central chamber and one or more nozzles in fluid communication with said central chamber;
a gear housing located within said showerhead, said nozzle housing being rotatably affixed to said gear housing so as to rotate about a longitudinal axis, said gear housing comprising a cavity in fluid communication with said showerhead's central conduit, said nozzle housing's central chamber in fluid communication with said cavity, said one or more nozzles configured to receive water from said central chamber and expel said water from said one or more nozzles; and
a gear train positioned within said gear housing, said gear train comprising a propeller, a toothed gear operatively engaged with said propeller, and a rocker plate configured to pivot along a horizontal axis, said propeller configured to spin in response to water entering said cavity and contacting said propeller, said toothed gear configured to rotate in response to said propeller rotating, said toothed gear comprising a pin configured to rotate in response to said toothed gear rotating, and wherein said rocker plate comprises a pin engaging lip configured to engage with said pin and wherein upon rotation of said toothed gear causes said pin to rotate in a circular path along said pin engaging lip and cause said rocker plate to pivot along said horizontal axis which thereby causes said nozzle housing to oscillate about said longitudinal axis.

2. The water spraying assembly of claim 1, further comprising one or more shoulder arms, wherein one of said one or more shoulder arms comprises a channel in fluid communication with said cavity and said central chamber.

3. The water spraying assembly of claim 2, wherein said channel is configured to receive water from said cavity and transport said water to said central chamber to be expelled through said one or more nozzles.

4. The water spraying assembly of claim 1, further comprising a toothed pinion extending co-axially from said propeller, wherein said toothed gear is operatively engaged with said propeller by said pinion, wherein said pinion is in toothed engagement with said toothed gear.

5. The water spraying assembly of claim 1, wherein said large toothed gear comprises an axis of rotation, and wherein the pin is configured to extend parallel but offset from said toothed gear's axis of rotation.

6. The water spraying assembly of claim 1, further comprising a lever configured to swing, wherein said rocker plate is configured to exert a force on said lever and cause said lever to swing, wherein said lever swinging is configured to cause said nozzle housing to oscillate.

7. The water spraying assembly of claim 1, wherein said rocker plate comprises an inner space, wherein said gear train is mounted on said gear housing by one or more arbors disposed within said inner space.

8. The water spraying assembly of claim 1, wherein said rocker plate comprises a first aperture and a second aperture, wherein said first aperture is configured for receipt of a lever configured to swing and cause said nozzle housing to oscillate, and wherein said second aperture is configured for receipt of a support rod configured to secure said rocker plate a front plate and define an axis of rotation for said rocker plate as it pivots along said horizontal axis.

9. The water spraying assembly of claim 1, further comprising an axle and a hollow shoulder arm comprising a channel in fluid communication with said cavity and said central chamber, wherein said axle extends through a bearing in said nozzle housing, and wherein said axle and hollow shoulder arm are configured to hold said nozzle housing in position along said longitudinal axis so as to prevent horizontal movement as water sprays out of said one or more nozzles.

10. The water spraying assembly of claim 1, further comprising a front plate and a back plate, wherein said front plate is affixed to said back plate, wherein said back plate forms a cover for said gear train, and wherein said front plate and said back plate are substantially rectangular in shape.

11. The water spraying assembly of claim 1, wherein said showerhead face includes at least one non-oscillating nozzle.

12. The water spraying assembly of claim 1, wherein said nozzle housing is configured to oscillate more than 30 degrees backward and forward.

* * * * *